June 26, 1962    D. H. BOGER, SR    3,040,404
SNAP HOOK
Filed Feb. 24, 1960
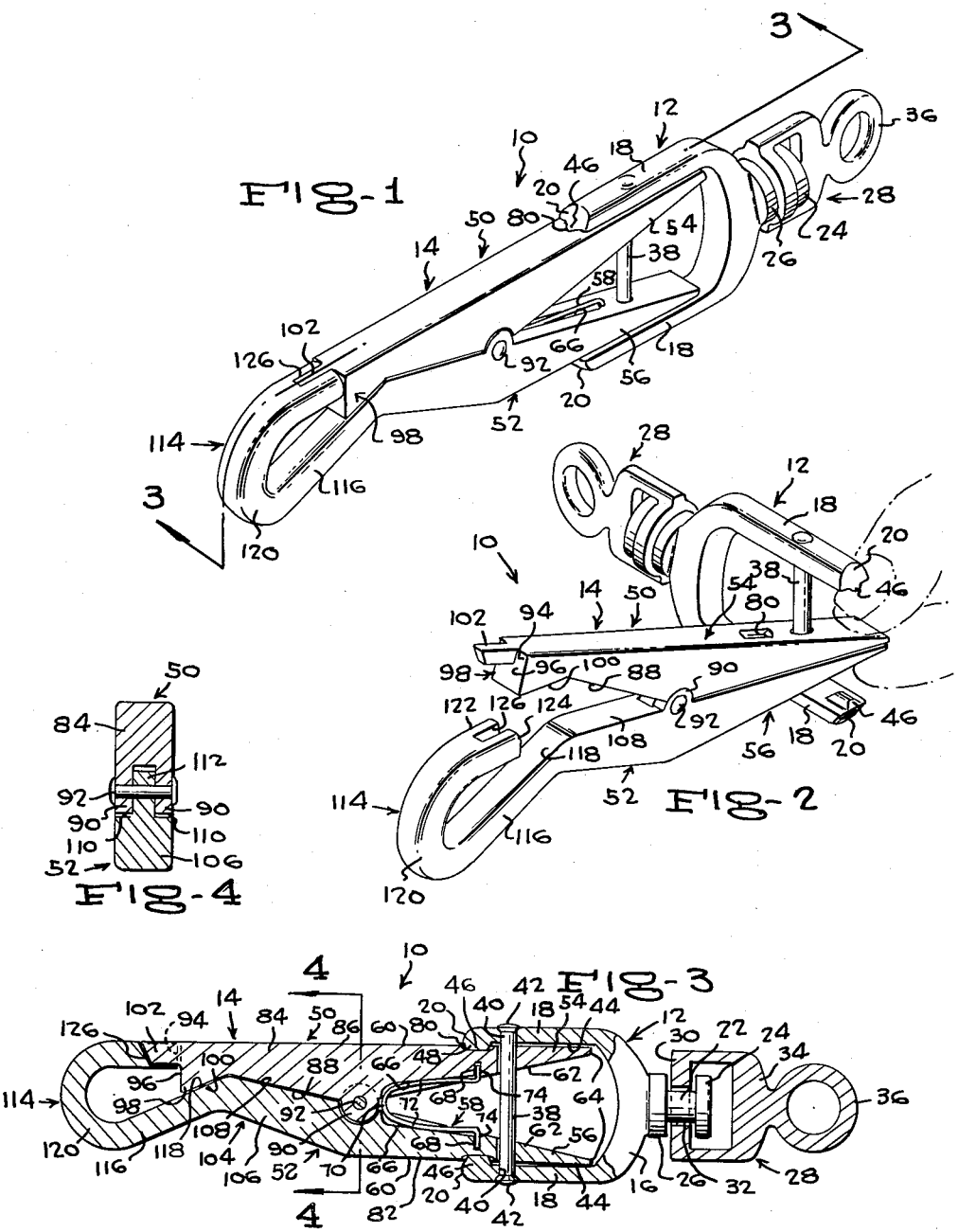
INVENTOR.
DAVID H. BOGER, SR.
BY
McMorrow, Berman & Davidson
ATTORNEYS

United States Patent Office 3,040,404
Patented June 26, 1962

3,040,404
SNAP HOOK
David H. Boger, Sr., R.F.D. 3, Box 31, Wynne, Ark.
Filed Feb. 24, 1960, Ser. No. 10,755
2 Claims. (Cl. 24—241)

This invention relates to a novel snap hook, especially but not exclusively for animal leashes.

The primary object of the invention is the provision of a safety snap hook which is designed to be engaged through such as a metal ring on an animal collar or harness and swivelly connected to a leash or tether rope, and which cannot be opened by the movements of an animal or by contact of the snap hook with objects, such as the ground, or structures against which an animal may rub or otherwise engage, while tethered, the snap hook being quickly and easily applied and removed from a ring.

Another object of the invention is to provide a rugged and simple snap hook of the character indicated above which is composed of a rigid frame section, to which a leash or tether is adapted to be secured, and a hook section which is pivoted on the frame section, the hook section being composed of spring-closed levers which have outer end portions which cooperate, in the closed position of the levers to define a closed hook, and inner end portions which engage certain portions of the frame section, while the sections are in longitudinal alignment with each other, and retaining means acting between the inner ends of the levers and said certain portions of the frame section in the aligned positions of the sections, which positively prevent swinging of the hook section out of alignment with the frame section, the levers of the hook section being capable of being compressed to open the hook only in a pivoted position of the hook section.

A further object of the invention is to provide, in a snap hook, of the character described above, stop means, acting between the levers of the hook section, which positively prevents a ring or the like engaged in the hook, from working between and opening the levers.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a snap hook of the invention with the sections thereof in aligned relationship;

FIGURE 2 is a perspective view of said snap hook, showing the hook section pivoted relative to the frame section, wherein the hook section levers are free to be compressed to open the lock;

FIGURE 3 is a longitudinal section taken on the line 3—3 of FIGURE 1; and

FIGURE 4 is a transverse section taken on the line 4—4 of FIGURE 3.

Referring in detail to the drawings, wherein like numerals designate like parts throughout the several views, the illustrated snap hook, generally designated 10, comprises a frame section 12 and a hook section 14.

The frame section 12 comprises a rigid, relatively heavy gauge U-shape having a bight portion 16 and parallel legs 18 having free ends 20. Fixed medially on the outer side of the bight portion 16 is an axial stud 22 having an enlarged diameter head 24 on its outer end, and a fixed enlarged diameter collar 26 spaced from the head 24. An open, preferably rectangular connector frame 28 has an end member 30 formed medially with an opening 32 through which the stud 22 is loosely journalled, with the collar 26 and the head 24 at opposite sides of the end member 30, in a swivel arrangement. The end member 34 of the connector frame 28 opposed to the end member 30 is increased in cross section and is formed with a longitudinally extending closed eye 36, to which a leash cord or chain or a tether (not shown) is to be secured.

The frame section 12 further comprises a right angular transverse pivot pin 38 which extends between the legs 18 through openings 40, formed in the legs at points near to and spaced longitudinally from the free ends 20 of the legs, and wherein the ends of the pin 38 are swaged or peened, as indicated at 42. The legs 18 have flat parallel inner surfaces 44, extending to the bight portion 16, and terminating at the inward sides of laterally inwardly extending locking lugs or detents 46. The locking lugs 46 are of substantial cross section, having tapered sides 48, and extend inwardly beyond the inner surfaces of the legs 18.

The hook section 14 comprises preferably solid, rigid longitudinally elongated first and second levers 50 and 52, respectively, which have in common, similar handle end portions 54 and 56, which are yieldably urged apart by a strong spring 58. The handle portions 54, 56 have flat longitudinal outer sides 60, and rearwardly divergent flat inner sides 62 which extend to the free rear ends 64 of the handle portions.

The inner lever sides 62 are formed, in their forward portions, with longitudinal grooves 66, at whose rear ends are sockets 68. The spring 58 is U-shaped and has a bight portion 70 and similar rearwardly extending legs 72 which terminate in lateral lugs 74. The spring 58 is disposed with the bight portion 70 at the forward ends of the grooves 66, with its legs 72 retainably engaged in and extending along related grooves 66, with their lugs 74 anchored in related sockets 68, the spring legs 72 being tensioned away from each other so as to urge the handle portions 54, 56 apart and into forcible engagement with the inner sides of the frame section legs 18 and resist manual compression of the handle portions together to the positions shown in FIGURES 1 and 2, respectively.

Although the locking lugs 46 are shown as being located forwardly of the pivot pin 38, it is within the purview of the invention to locate the locking lugs rearwardly of the pivot pin. In either case, the locking lugs or detents 46 are adapted to engage in detent recesses 80, 82 which are formed in the outer sides 60 of the handle portions 54, 56, respectively, in positions to retainably secure the lugs or detents, in the longitudinally aligned relationship of the sections 12 and 14, and lock the hook section 14 against being pivoted laterally out of such relationship, while the snap hook 10 is in service. Under all ordinary and anticipated conditions of service of the snap hook, the hook section 14 cannot be loosened to pivot relative to the frame section 12, unless and until vigorous manual compression be exerted upon the handle portions 54, 56, sufficient to overcome the resistance of the spring 58 and move the handle portions toward each other far enough to withdraw the lugs or detents 46 from the detent recesses 80, 82.

The first lever 50 comprises, besides its handle portion 54, a longitudinally elongated forward portion 84 which has an outer side 86 which is flush with the outer side 60 of the handle portion 54. The forward portion 84 has a flat forwardly and laterally angled inner side 88, which, with the forward end of the inner side of the handle portion 54, forms an apex on which is a pair of laterally inwardly extending spaced ears 90, through which a headed hinge pin 92 is secured.

The forward lever portion 84, as shown in FIGURE 3, has a squared forward end 94 with which is flush the flat forward end 96 of a substantially triangular stop block 98 which extends laterally inwardly beyond the inner side 88, at the forward end of the side 88, and has a rearwardly and laterally outwardly angled inner surface 100 which intersects the forward end of the inner side 88. Fixed centrally on and extending forwardly from the forward end 96 of the forward lever portion 84 is a longitudinal rectangular cross section nose 102 which is spaced from the side surfaces of the lever portion 84 and from the stop block 98.

The second lever 52 comprises, besides the handle portion 56, a forward portion 104 which is larger than the forward portion 84 of the lever 50. The forward portion 104, as shown in FIGURE 3, is composed of a rear portion 106 which is angled forwardly and laterally inwardly relative to the handle portion 56, and has a flat inner side 108 which is flush with the inner side 88 of the lever 50, and which is formed, at its rear end, with spaced arcuate notches 110, to receive the ears 90 on the lever 50, and an upstanding ear 112 which is journalled on the hinge pin 92 between the ears 90, so as to hinge the levers 50 and 52 together.

On the forward end of the rear portion 106 is a hook 114 which comprises a forwardly and laterally outwardly angled shank 116 which has an inner side 118 which is similarly angled, in order to make flush contact, when the levers 50 and 52 are closed, with the angled inner side 100 of the stop block 98. The shank 116 extends forwardly beyond the stop block 98 and merges into a horse-shoe shaped snell 120 which extends laterally inwardly from the shank 116, and terminates in a straight longitudinally inwardly and rearwardly extending terminal 122 which has in its rear end 124 a centralized notch 126 which snugly receives the nose 102 on the lever 50, in the closed positions of the levers 50 and 52, as shown in FIGURES 1 and 3. The engagement of the nose 102 in the notch 126 prevents weaving of the forward ends of the levers 50 and 52 relative to each other, unites the resistances of the two levers to twisting forces, and provides positive retention in the snell 120 of such as a dog collar or bridle ring (not shown) engaged therethrough.

Further, the presence of the stop block 98, and its flush engagement with the hook shank 116 positively prevents such as a ring, which in all cases will be greater in gauge than any space which can develop between the block and the shank, from working rearwardly between the levers 50 and 52 and opening the hook 114.

As shown in FIGURE 2, the hook 114 can be opened, to release a ring therefrom, only by applying sufficiently vigorous compression to the handle portions of the levers 50 and 52, to disengage the detent lugs 46 of the frame section 12 from the detent recesses 80, 82 in the handle portions, and enable lateral pivoting of the hook section 14, relative to the frame section 12, whereat the lever handle portions can be forced together, against the resistance of the spring 58, so as to swing the hook snell 120 away from the lever 50 and its nose 102.

It is believed obvious that the above described device of the invention has ready applicability to uses other than the connection of animal leashes and tethers mentioned above, such as the securing of boat lines, guy lines, and the like, wherein the ease and rapidity of securement or connection of the device, its ease and rapidity of disconnection, and its secure and reliable maintenance of each connection, under severe adverse conditions, are to be appreciated.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A snap hook comprising a U-shaped frame section and a hook section, and means on said frame section for connection to a tether, said frame section having a pair of parallel spaced legs having free ends and inner sides, said hook section comprising opposed first and second levers having forward portions and rearwardly extending handle portions, means hinging the levers together at points intermediate their ends, spring means positioned between and secured to said handle portions and spreading said handle portions apart, said handle portions being positioned between the frame section legs and having outer sides forcibly bearing against the inner sides of said legs, a pivot pin extending through said legs and said handle portions providing for pivoting of the hook section relative to the frame section only in a compressed condition of the handle sections of the levers, detent recesses and locking lugs severally on the inner sides and outer sides of the frame section legs and said handle portions and engageable to hold the frame and hook sections against pivoting relative to each other in longitudinally aligned relationship while the handle portions are in spread condition, the recesses and lugs being forcibly maintained in engagement with each other by the pressure of said spring means, and cooperating hook forming components on the forward portions of the levers, said components comprising a nose on and extending forwardly from the forward end of said first lever, a shank on and extending forwardly from the forward end of said second lever, said shank terminating in a laterally inwardly and rearwardly curved snell extending toward the forward end of the first lever and ending in a rearwardly extending terminal engaging said nose, said shank having an inner side, said forward portion of said first lever having a laterally inwardly extending stop block engaging the inner side of the shank so as to prevent a ring engaged in the hook formed by the snell and the nose from entering between the stop block and the inner side of the shank and spreading the levers away from each other and disengaging the snell terminal from the nose.

2. A snap hook comprising a U-shaped frame having a cross member and laterally spaced legs, said legs having free ends, first and second coextensive levers having handle portions and forward portions, means pivoting the levers together at a point intermediate their ends, spring means urging the handle portions away from each other and the forward portions toward each other, said handle portions being positioned between the frame legs and being normally engaged with the legs by said spring means, a pivot pin extending between the frame legs at a point adjacent to and spaced from their free ends, said handle portions having openings through which said pivot pin extends, detent lugs on the free ends of the frame legs, detent recesses on the handle portions in which the lugs normally engage for holding the levers in longitudinal alignment with the frame legs, the levers being swingable on the pivot pin out of alignment with the frame legs only in a compressed condition of the handle portions of the levers wherein the lugs are disengaged from the detent recesses, a stop block on the forward portion of said first lever, a shank on the forward portion of said second lever and engaging said block to prevent a ring when engaged by the forward portions of said first and second levers from entering between the stop block and shank and spreading the levers away from each other.

References Cited in the file of this patent

UNITED STATES PATENTS

| | | |
|---|---|---|
| 281,987 | Evans | July 24, 1883 |
| 300,810 | Smith | June 24, 1884 |
| 1,169,664 | Martin | Jan. 25, 1916 |
| 1,758,038 | Hancock | May 13, 1930 |
| 2,595,700 | Plough | May 6, 1952 |